E. SPRENGER.
METHOD OF MIXING BINDING AGENTS AND OTHER SUBSTANCES WITH GRANULAR MATERIAL.
APPLICATION FILED JUNE 30, 1911.
1,057,590.
Patented Apr. 1, 1913.
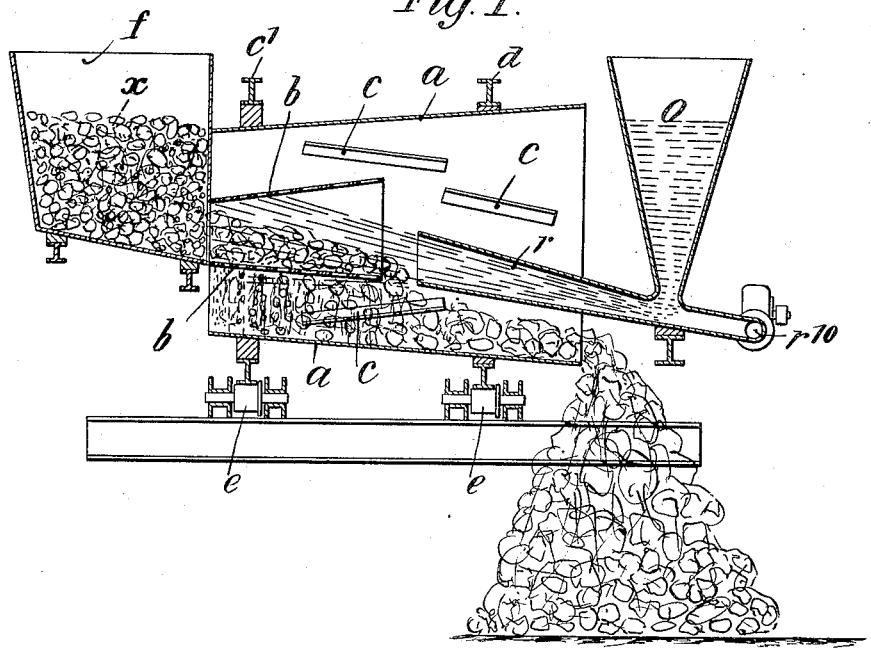
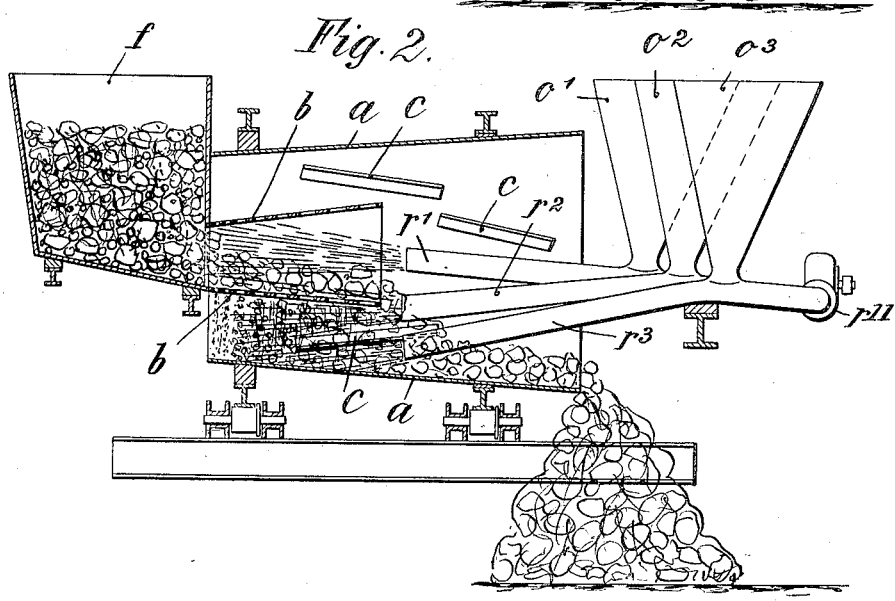

UNITED STATES PATENT OFFICE.

EMIL SPRENGER, OF GOLDACH, SWITZERLAND.

METHOD OF MIXING BINDING AGENTS AND OTHER SUBSTANCES WITH GRANULAR MATERIAL.

1,057,590.   Specification of Letters Patent.   Patented Apr. 1, 1913.

Application filed June 30, 1911.   Serial No. 636,250.

*To all whom it may concern:*

Be it known that I, EMIL SPRENGER, a citizen of the Swiss Republic, residing at Goldach, Canton of St. Gall, in Switzerland, have invented a certain new and useful Improvement in Methods of Mixing Binding Agents and other Substances with Granular Material, of which the following is a specification.

The object of this invention is to provide an improved method of mixing granular matter with binding agents, coloring matter, and other substances (which may be likewise granular, or liquid).

My improved method consists in sifting the primary granular matter, so as to separate granules of different degrees of fineness, and at the same time subjecting it to the action of a stream or streams of the admixture, delivered in such manner that the periods during which the granules are exposed to the stream vary according to the size of the granules, the granules with larger surface area being exposed to the stream for longer periods than the smaller granules, so that a uniform and thorough mixing effect is obtained. Examples of substances which can with advantage be dealt with in this manner are sand, ground slag, saw-dust, cork and the like (primary granular substances), with admixtures such as cement, lime, gypsum and the like, with or without added coloring matter, the mixtures being for example used for the manufacture of concrete, artificial stone, compositions for use as substitutes for wood, etc., in connection with which the qualities of strength, durability, uniformity of setting and the like are largely dependent on the thoroughness and uniformity of the mixing process and the accuracy with which the proportions of the ingredients are measured.

Two forms of apparatus suitable for carrying the invention into effect are illustrated in the accompanying drawing, in which:—

Figure 1 is a longitudinal section of a machine for mixing a primary granular substance with another granular substance, and Fig. 2 a longitudinal section of a machine which is exactly similar to that shown in Fig. 1 in regard to the mixing drum and the feed and sifting appliances for the primary granular substance, but which has apparatus for separately injecting several kinds of granular admixture.

Referring in the first place to Fig. 1, the apparatus illustrated comprises a rotary drum $a$ forming the mixing chamber, coned and provided with runners $c'$ $d$ by means of which it rests upon rollers $e$. The conical shape of the drum is not essential to the invention; a cylindrical drum or a drum of polygonal cross-section may be used. The drum is open at the right hand end, but is closed at the other end, except in regard to a central aperture in the head, from the circumference of which a tubular sifting device $b$ projects into the interior of the drum. This sifting device is flared toward the interior, and has wall apertures whereof the size increases in the direction toward the interior of the drum. A feed hopper $f$ for the primary granular mass $x$ is supported outside the drum, with its delivery orifice in communication with the aperture in the head of the drum, and feeds the primary granular material through the said aperture into the tubular sifter, so that during the rotation of the drum the granules fall through the apertures of the sifter, the larger granules being retained in the sifter longer than the smaller granules, as they must advance till the holes become sufficiently large to give them passage. The drum has internal ribs $c$ forming auxiliary mixing appliances by which the granular matter is carried upward from the bottom of the drum, and then dropped. Outside the open end of the drum there is a stationary container $o$ for granular matter to be mixed with the primary granular matter fed at the other end into the sifter. This secondary granular matter, which I will call the admixture, falls through a delivery orifice at the bottom of the container into the nozzle $r$ of a blower $r^{10}$, from which a stream of air sweeps through the drum and through the tubular sifter, carrying with it a stream of the granular admixture. This stream acts longest, by direct impact, on those portions of the primary granular, which are longest retained in the sifter. The granules of the primary material which fall through the apertures of the sifter are tumbled about, and re-mixed by the mixing appliances $c$ in the drum, and in the course of this remixing process are acted on by stray particles of the admixture which have not passed into the sifter with the stream of air directed toward the sifter. With some admixtures it is of advantage to use steam instead of air, as a carrier therefor, in which case a steam injecting nozzle is substituted for the blower. For admixtures in a liquid state, a pump and nozzle are used, arranged so as to project a jet or spray of the liquid toward the sifter.

Fig. 2 shows apparatus for injecting three different admixtures. The drum, sifter and parts directly accessory thereto being exactly similar to those shown in Fig. 1, the same references are used for these parts in Fig. 2, and the same need not be again described. The admixture apparatus in this case has three containers, marked $o^1$, $o^2$, and $o^3$, and in the following description it will be assumed that these are used, in the order enumerated, for powdered Portland cement, slag cement and hydraulic lime respectively. The blower $r^{11}$ in this case has three nozzles, marked $r^1$, $r^2$, $r^3$, and the three containers feed the three admixtures into these nozzles respectively. The nozzle $r^1$ delivers Portland cement directly on to the primary granular matter rolling upon the wall of the tubular sifter $b$, the finest ground, and therefore most valuable, particles of the cement being those which reach the sifter and there mingle with the primary granular matter, penetrating the interstices and thoroughly enveloping the granules. Coarser particles of the Portland cement fall to the bottom of the drum before reaching the sifter. The nozzle $r^2$ delivers a stream of slag cement to the granular matter, already enveloped with Portland cement, falling through the apertures of the sifter, this stream being directed so that it acts on the granules immediately after they leave the sifter. Coarser particles of slag cement fall to the bottom of the drum before reaching the sifter. The stream of hydraulic lime emitted by the pipe $r^3$ strikes the falling primary granular matter at a level below the stream of slag cement, so that falling granules receive a layer of the finest particles of hydraulic lime, superimposed upon the layer of slag cement, which has in turn been superimposed upon the layer of Portland cement. The coated granules are mixed, in the drum, with the coarser particles of Portland cement, slag cement, and hydraulic lime which have fallen to the bottom of the drum before reaching the sifter.

What I claim as my invention and desire to secure by Letters Patent of the United States is:—

1. The method of mixing and enveloping a primary granular material, comprising granules of different sizes, with secondary finely divided material, consisting in temporarily grading the granules of primary material according to size, exposing the granules of different sizes to a stream of the secondary material for periods varying in proportion with said different sizes, and remixing the graded granules.

2. The method of mixing and enveloping a primary granular material, comprising granules of different sizes, with secondary finely divided material, consisting in exposing said primary material to a stream of said secondary material, during such exposure successively separating granules of different sizes from said primary material, in order of increasing size, and remixing said separated granules.

3. The method of mixing and enveloping a primary granular material, comprising granules of different sizes, with a plurality of finely divided secondary materials, consisting in temporarily grading the granules of primary material according to size, exposing the granules of different sizes to streams of the secondary materials for periods varying in proportion with said different sizes, and remixing the graded granules.

In witness whereof I have signed this specification in the presence of two witnesses.

EMIL SPRENGER.

Witnesses:
  RANDALL ATKINSON,
  ALBERT PHILLIPS.

---

Copies of this patent may be obtained for five cents each, by addressing the "Commissioner of Patents, Washington, D. C."